United States Patent
Mueller et al.

(10) Patent No.: US 9,798,422 B2
(45) Date of Patent: Oct. 24, 2017

(54) METHOD FOR OPERATING A PRESSURE-SENSITIVE CONTROL PANEL OF A MOTOR VEHICLE

(71) Applicant: AUDI AG, Ingolstadt (DE)

(72) Inventors: Ulrich Mueller, Ingolstadt (DE); Michael Wachinger, Winkelhausen (DE); Tim Kraemer, Eitensheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/504,235

(22) PCT Filed: Oct. 29, 2015

(86) PCT No.: PCT/EP2015/002158
§ 371 (c)(1),
(2) Date: Feb. 15, 2017

(87) PCT Pub. No.: WO2016/082908
PCT Pub. Date: Jun. 2, 2016

(65) Prior Publication Data
US 2017/0277353 A1    Sep. 28, 2017

(30) Foreign Application Priority Data
Nov. 24, 2014    (DE) .................. 10 2014 017 377

(51) Int. Cl.
*G06F 3/041*    (2006.01)
*G06F 3/0354*    (2013.01)
(Continued)

(52) U.S. Cl.
CPC ............ *G06F 3/0418* (2013.01); *B60K 37/06* (2013.01); *B60W 40/06* (2013.01); *G06F 3/0414* (2013.01);
(Continued)

(58) Field of Classification Search
CPC .. G06F 3/0414; G06F 3/0418; G06F 3/03547; G06F 2203/04105
See application file for complete search history.

(56) References Cited

U.S. PATENT DOCUMENTS

2010/0177057 A1   7/2010 Flint et al.
2012/0223900 A1*  9/2012 Jiyama .................... G06F 3/041
                                                      345/173

FOREIGN PATENT DOCUMENTS

DE            10000218  A1   7/2001
DE        102006037156  A1   9/2007
(Continued)

OTHER PUBLICATIONS

German Office Action for Appln. No. 102014017377.1 dated Oct. 1, 2015.
(Continued)

*Primary Examiner* — Larry Sternbane
(74) *Attorney, Agent, or Firm* — Staas & Halsey LLP

(57) ABSTRACT

A detection device detects a position at which a touch-sensitive operator control unit is touched by an object by detecting a pressure ($p_m$) which is applied to the touch-sensitive operator control unit by the object at the position. In addition, a speed ($v_m$) and/or an acceleration ($a_m$) of the motor vehicle is detected and a pressure threshold value ($p_s$) is predefined as a function of speed ($v_m$) and/or accelerations ($a_m$) of the motor vehicle. The method determines whether the detected pressure ($p_m$) is higher than the predefined pressure threshold value ($p_s$) and triggers a function (F), assigned to the detected position, of the motor vehicle exclusively if the detected pressure ($p_m$) is higher than the predefined pressure threshold value ($p_s$).

13 Claims, 2 Drawing Sheets

(51) Int. Cl.
*B60W 40/06* (2012.01)
*B60K 37/06* (2006.01)

(52) U.S. Cl.
CPC .. *B60K 2350/1024* (2013.01); *B60W 2520/00* (2013.01); *B60W 2550/147* (2013.01); *G06F 3/03547* (2013.01); *G06F 2203/04105* (2013.01)

(56) References Cited

FOREIGN PATENT DOCUMENTS

| | | |
|---|---|---|
| DE | 102008051051 A1 | 3/2010 |
| DE | 102011011802 A1 | 8/2012 |
| DE | 102011114031 A1 | 3/2013 |
| DE | 102011089894 A1 | 6/2013 |
| DE | 102012222519 A1 | 6/2013 |
| DE | 102012005800 A1 | 9/2013 |
| DE | 102014017377.1 | 11/2014 |
| DE | 102013021875 A1 | 6/2015 |
| EP | 2 793 111 A1 | 10/2014 |
| FR | 2 961 610 A1 | 12/2011 |
| WO | 2013/092725 A1 | 6/2013 |
| WO | PCT/EP2015/002158 | 10/2015 |

OTHER PUBLICATIONS

International Search Report for PCT/EP2015/002158 dated Feb. 23, 2016.

\* cited by examiner

METHOD FOR OPERATING A PRESSURE-SENSITIVE CONTROL PANEL OF A MOTOR VEHICLE

CROSS REFERENCE TO RELATED APPLICATIONS

This application is the U.S. national stage of International Application No. PCT/EP2015/002158, filed Oct. 29, 2015 and claims the benefit thereof. The International Application claims the benefit of German Application No. 102014017377.1 filed on Nov. 24, 2014, both applications are incorporated by reference herein in their entirety.

BACKGROUND

Described below is a method for operating an operator control apparatus of a motor vehicle which includes detection of a position at which a touch-sensitive operator control unit is touched by an object, and the detection, by way of a pressure sensor, of a pressure with which the touch-sensitive operator control unit is acted on by the object at the position. Also described is an operator control apparatus that performs the method.

Touch-sensitive operator control units or touchpads are already known from the related art and are used for example in laptops in order to control or select functions of the laptop. The touchpads can normally determine a position of a finger by which a user touches the touchpad, thus permitting interaction with content on the screen of the laptop. For this purpose, it is for example possible for a mouse pointer on the screen to be controlled by virtue of the user using his or her finger to touch the touchpad.

Such touchpads are increasingly also used in motor vehicles in order to be able to control functions of the motor vehicle, for example infotainment components, a navigation system or a telephone. While the motor vehicle is travelling, the driving characteristics and other influences may give rise to acceleration forces which also act on the driver. The acceleration forces can influence an operator control action on the touchpads, for example an input by way of the finger on the touch-sensitive operator control unit. This can give rise to deviations between the desired input and the actual input on the touchpad. For this purpose, DE 10 2001 089 894 A1 proposes a method by way of which, despite an input deviating from the intended input, the motor vehicle functions corresponding to the intended input are executed or accessed.

It is also known from the related art for touchpads to be combined with a force sensor arrangement which determines a finger force of the user, that is to say a pressure which the user exerts on the touchpad by way of his or her finger. Triggering of a function by way of an actuating force or an actuating pressure is thus possible. This means that the user can highlight a function for example by way of a sliding movement over the touchpad and can select the function by way of a pressing action. Thus, the behavior of a conventional mechanical button can be simulated. Only when pressure is exerted on the touchpad is the respective function triggered. To further improve the subjective impression of quality during the actuation, a mechanical haptic impulse, for example a vibration, may be generated by way of an actuator. This is also known for example from FR 2 961 610 A1. Furthermore, it is also possible for an acoustic tone, for example a click sound, to be generated by way of a loudspeaker during an actuation. The touchpad has virtually the same feel as a mechanical button during the actuation.

DE 10 2008 051 051 A1 presents a method for displaying information in a vehicle, in which method a subset is displayed on a display surface, wherein a size of the displayed subset is dependent on an enlargement factor.

SUMMARY

The method described below provides a more pleasant and more reliable operator control of an operator control apparatus, and by way of which instances of erroneous operator control can be avoided.

A method according for the operation of an operator control apparatus of a motor vehicle includes detection of a position at which a touch-sensitive operator control unit is touched by an object, and the detection, by way of a detection device, of a pressure with which the touch-sensitive operator control unit is acted on by the object at the position. The method also includes detection of a speed and/or an acceleration of the motor vehicle, the predefinition of a pressure threshold value as a function of the detected speed and/or the detected acceleration of the motor vehicle, the determination of whether the detected pressure is higher than the predefined pressure threshold value, and the triggering of a function, assigned to the detected position, of the motor vehicle only if the detected pressure is higher than the predefined pressure threshold value.

Functions of the motor vehicle, for example infotainment functions of the motor vehicle, can be selected and/or triggered and/or controlled by way of the operator control apparatus. The operator control apparatus has a touch-sensitive operator control unit which may for example be in the form of a touch-sensitive surface or in the form of a touchpad, and which can implement touch sensitivity by way of functional principles that are known per se. The touch-sensitive operator control unit can identify a position of an object, for example a finger of a user, on the touch-sensitive operator control unit. Furthermore, the operator control apparatus has a detection device, for example a pressure sensor, by way of which a pressure or a force which the object exerts on the touch-sensitive surface when touching the position is detected.

According to the method, the function assigned to the position is triggered only if the pressure which acts on the associated position, which pressure is exerted on the touch-sensitive operator control unit by the object or by the finger and is detected by the detection device, exceeds a predefined pressure threshold value, that is to say if the exerted pressure is higher than the predefined pressure threshold value. The predefined pressure threshold value may also be referred to as a triggering threshold. To trigger the function, it is thus provided that the user applies to the touch-sensitive operator control unit a pressure or a triggering pressure which exceeds the triggering threshold.

Furthermore, the predefined pressure threshold value is changed or varied as a function of a speed and/or an acceleration of the motor vehicle. Here, as the speed, it is provided in particular that a speed in the direction of travel of the motor vehicle is detected. As the acceleration, it is provided in particular that an acceleration vector, which may have a component in the vehicle longitudinal direction and/or a component in the vehicle transverse direction and/or a component in the vehicle vertical direction, is detected. The speed and/or the acceleration may in this case be detected continuously or at predefined points in time. The pressure threshold value is predefined in a manner dependent on the detected speed and/or the detected acceleration. For example, if the speed changes between two detection times, the pressure threshold value may be adapted dynamically to the change. To thus be able to select and/or trigger and/or control the function, it is provided that the user, by way of the object, applies a pressure to that position on the touch-sensitive operator control unit which is assigned to the function, which pressure exceeds the presently prevailing predefined pressure threshold value.

Here, the functions may be assigned to defined positions on the touch-sensitive operator control unit. For this purpose, it is for example possible for labels or symbols to be displayed on the touch-sensitive operator control unit, which labels or symbols describe the function assigned to the respective defined position. To trigger a function, for example, the user thus applies the triggering pressure to the touch-sensitive operator control unit at the assigned position provided with the label. The user is thus given the impression of operating a mechanical button.

It may however also be provided that the positions, assigned to the functions, on the touch-sensitive operator control unit arise from an interaction of the touch-sensitive operator control unit with a display unit of the motor vehicle. For example, a pointer element, for example a mouse pointer, may be controlled on the display unit by touching the touch-sensitive operator control unit, and the touch-sensitive operator control unit is pressed with the triggering pressure when the pointer element is situated at the desired position on the display element. It is thus possible for a function displayed on the display unit to be highlighted by way of the pointer element and selected and/or triggered by pressing the touch-sensitive operator control unit. In this case, the touch-sensitive operator control unit is thus operated in the manner of a touchpad known per se.

It is however also possible for the touch-sensitive operator control unit to be divided into regions, wherein it is for example provided that, in a first region, the touch-sensitive operator control unit is operated in the manner of a touchpad known per se, by virtue of the touch-sensitive operator control unit interacting with a display unit. In a second region of the touch-sensitive operator control unit, it is for example possible for labels to be provided at absolute positions, wherein, by pressing the operator control unit at one of the absolute positions, the assigned defined function can be triggered. The positions, assigned to the predefined or defined functions, in the second region are also referred to as so-called preset buttons. A preset button of the type may for example be a menu button, by way of which a menu situation can be accessed on the display unit, or a navigation button, which can be used, for example, to exit a menu situation displayed on the display unit.

By way of the method, it is thus possible for a pressure threshold value to be adapted to a driving situation based on speed and/or acceleration, because the attention that a driver of the motor vehicle can pay to the operator control apparatus is generally dependent on the driving situation. It is thus possible for easy operator control of the operator control apparatus, without instances of erroneous operator control, to be made possible for a driver in all driving situations.

In one advantageous embodiment, a characteristic curve is predefined, on the basis of which every speed value and/or every acceleration value is assigned a pressure value, wherein one of the pressure values is predefined, as a function of the detected speed and/or detected acceleration of the motor vehicle, as the pressure threshold value. The pressure values may also be predefined in a value table, for example a lookup table (LUT). Here, the pressure values and the speed values and/or the pressure values and the acceleration values may for example be proportional to one another. The characteristic curve may thus for example represent a linear function. Thus, the pressure threshold value is also varied proportionally to the detected speed and/or detected acceleration.

Alternatively, the speed values and/or the acceleration values may be divided into intervals, wherein each of the intervals is assigned a constant pressure value. In this case, the characteristic curve may thus represent a step function. Thus, the pressure threshold value is also varied in stepwise fashion. It may however also be provided that the characteristic curve is divided into regions, wherein, in one subregion, a pressure value behaves proportionally to a speed and/or an acceleration, and in another subregion, constant pressure values are provided for a predetermined speed interval and/or acceleration interval.

By way of the characteristic curve or the value table, it is possible in a particularly simple manner to permit an assignment between speed and pressure and/or between acceleration and pressure, by virtue of the pressure value corresponding to the detected speed and/or to the detected acceleration being selected from the characteristic curve and predefined as the pressure threshold value. The pressure threshold value can thus be dynamically adapted, in a particularly simple manner and without complex calculations, to the presently measured speed and/or the presently measured acceleration.

The pressure value may be increased with increasing speed and/or increasing acceleration. Here, the method takes into consideration the realization that a driver must normally concentrate more on the traffic situation the faster he or she is driving, and/or the more intensely he or she is accelerating. Therefore, with increasing speed and/or increasing acceleration, it becomes more difficult for the driver to divert his or her attention to the operator control of the operator control apparatus. To prevent instances of erroneous operator control by the driver in the case of increasing speed and/or increasing acceleration, the pressure threshold value is raised. In the presence of a relatively high pressure threshold value, the user must thus apply a greater pressure to the touch-sensitive operator control unit—that is to say must press more intensely on the touch-sensitive operator control unit—than in the presence of a relatively low pressure threshold value. It is thus advantageously possible for instances of erroneous operator control of the operator control apparatus to be prevented.

For example, a first pressure value may be predefined as the pressure threshold value if the motor vehicle is at a standstill, and a second pressure value may be predefined as the pressure threshold value if the motor vehicle is travelling. A user, in particular the driver of the motor vehicle, generally turns his or her attention to the operator control of the operator control apparatus when the motor vehicle is at a standstill. Here, the user normally perceives a relatively low triggering pressure or a relatively low triggering force to be pleasant, such that the triggering of the function can be performed quickly and "easily". Therefore, when the motor vehicle is at a standstill, it is for example possible for a first pressure value to be defined as the pressure threshold value which permits easy and fast triggering of the function. The pressure value may for example amount to approximately 3 N.

During travel, however, the primary task of the driver is to control the motor vehicle. Here, the driver generally operates the operator control apparatus or the touchpad "blind", that is to say without diverting his or her view to the touchpad. Here, inadvertent triggering of the function is easily possible, because, when approaching or when touching the touch-sensitive operator control unit, it is easily possible to inadvertently exceed a triggering threshold that has been selected to be too low. Therefore, it has proven to be advantageous for the triggering threshold to be raised when the motor vehicle is travelling, that is to say while the driver is controlling the motor vehicle. In other words, this means that a second pressure value, which is higher than the first pressure value, is predefined as the pressure threshold value. Here, the second pressure value may for example amount to approximately 5 N. By way of the method, it is thus possible to provide user-friendly and easy operator control of the operator control apparatus.

It may be provided that at least one third pressure value is predefined as the pressure threshold value if the motor vehicle is travelling and the detected speed and/or the detected acceleration exceeds a predefined speed value and/or a predefined acceleration value. It is thus possible for different triggering thresholds to be provided even during travel. Here, it is for example possible, during travel, for the second pressure value to be predefined as the pressure threshold value if the detected speed and/or the detected acceleration undershoots the predefined speed value and/or the predefined acceleration value or corresponds to the predefined speed value and/or to the predefined acceleration value. The third pressure value may be provided as the pressure threshold value as soon as the detected speed and/or the detected acceleration exceeds the predefined speed value and/or the predefined acceleration value. Through the predefinition of only three pressure threshold values, it is possible for a user, in particular the driver, to particularly easily become familiar with the operator control of the operator control apparatus.

An embodiment provides that, if it is detected that an underlying surface on which the motor vehicle is moving has bumps, the pressure threshold value is increased in relation to a pressure threshold value that is predefined in the case of an underlying surface which does not have bumps, wherein, on the basis of the detected speed and/or the detected acceleration, it is determined whether the motor vehicle is moving on the underlying surface which has bumps. In other words, this means that the pressure threshold value is increased if, on the basis of the detected speed and/or the detected acceleration, it is determined that the motor vehicle is moving on an underlying surface which has bumps. If the motor vehicle is moving on an underlying surface with bumps, for example on an uneven or rough roadway, the resulting vibrations of the motor vehicle can also influence the user, in particular the driver of the motor vehicle, and his or her operator control inputs. For example, if the user wishes to trigger or select a particular function of the motor vehicle, the vibrations can make it difficult for the user to use the object or the finger to touch and/or press that position on the touch-sensitive operator control unit which is assigned to the function. Thus, the vibrations may result in erroneous operator control on the part of the user if the triggering threshold or the pressure threshold value is selected to be too low. For this reason, the triggering threshold or the pressure threshold value is raised in order to advantageously permit correct and pleasant operator control of the operator control apparatus even on uneven roadways.

It has proven to be advantageous if, for the determination of the underlying surface which has bumps, a vertical acceleration of the motor vehicle is detected over a predefined time interval, and it is checked whether the vertical acceleration has, within the time interval, a substantially periodic profile caused by the bumps. In other words, this means that, over a predefined time period or a predefined time interval, it is monitored as to whether a profile of the vertical acceleration has a periodicity. Specifically, if the motor vehicle is travelling on an underlying surface which has bumps, the roadway unevennesses are transmitted to the motor vehicle, in particular to a body of the motor vehicle, which may result, for example, in an upward and downward movement or a shaking of the motor vehicle in the vertical direction, that is to say in the vehicle vertical direction. The upward and downward movement or the shaking in the vertical direction can be detected by way of the vertical acceleration, and exhibits a substantially periodic profile. A substantially periodic profile, which in particular exceeds a predetermined frequency, thus indicates that the motor vehicle is moving on an uneven roadway. By analyzing the vertical acceleration, it is thus possible in a simple manner to establish whether an underlying surface which has bumps is present, and whether an increase of the triggering threshold is necessary.

An acceleration of the motor vehicle may be measured so that a pressure which is exerted on the detection device by an inherent weight of the touch-sensitive operator control unit during the acceleration of the motor vehicle is detected by way of the detection device. During an acceleration of the motor vehicle, the touch-sensitive operator control unit, which has a mass or an inherent weight, is accelerated. Owing to the acceleration, the touch-sensitive operator control unit exerts a pressure or a force on the detection device, for example the pressure sensor, which pressure or force is measured by the detection device. Through detection of the acceleration by way of the detection device of the operator control apparatus, the operator control apparatus is of particularly autonomous design, because it is advantageously possible to dispense with communication with other sensor devices of the motor vehicle which can detect an acceleration.

It may be provided that an acceleration and/or speed is measured by at least one sensor device of the motor vehicle and is made available for the predefinition of the at least one pressure threshold value. For this purpose, the speed detected as a sensor signal, and/or acceleration detected as a sensor signal, by the at least one sensor device may be made available to a control device assigned to the operator control apparatus, which control device can predefine the pressure threshold value as a function of the sensor signal. Such sensor devices may for example be in the form of speed sensors and/or acceleration sensors, and are generally provided in motor vehicles in any case. It is thus possible for a measured speed and/or a measured acceleration to be made available with particularly little outlay.

Also described below is an operator control apparatus for a motor vehicle, having a touch-sensitive operator control unit which is designed to detect a position at which the touch-sensitive operator control unit is touched by an object, and having a detection device which is designed to detect a pressure with which the operator control unit is acted on by the object at the position. The operator control apparatus furthermore has a control device which is designed to predefine at least one pressure threshold value as a function of a detected speed and/or a detected acceleration of the motor vehicle, to determine whether the detected pressure is higher than the predefined pressure threshold value, and to effect a triggering of a function, assigned to the detected position, of the motor vehicle if the detected pressure is higher than the predefined pressure threshold value. The operator control apparatus may for example be arranged in a central console of the motor vehicle.

The embodiments presented with reference to the method, and the advantages thereof, apply correspondingly to the operator control apparatus.

BRIEF DESCRIPTION OF THE DRAWINGS

These and other aspects and advantages will become more apparent and more readily appreciated from the following description of an exemplary embodiment, taken in conjunction with the appended drawings of which.

DETAILED DESCRIPTION OF THE PREFERRED EMBODIMENT

Figure 1:
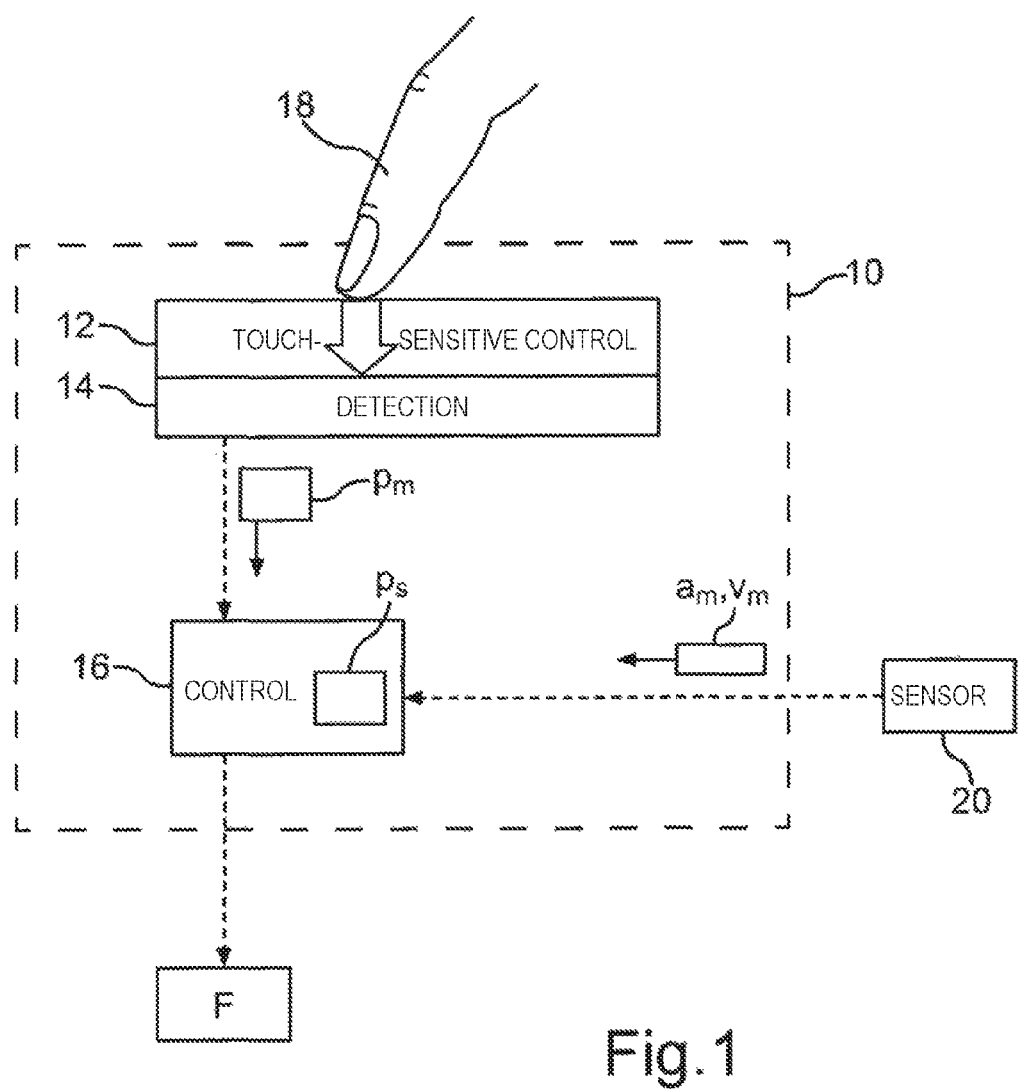
FIG. 1 is a schematic block diagram of an embodiment of an operator control apparatus.

Reference will now be made in detail to the preferred embodiments, examples of which are illustrated in the accompanying drawings, wherein like reference numerals refer to like elements throughout.

The exemplary embodiment discussed below is an embodiment. In the exemplary embodiment, it is however the case that the described components of the embodiment each constitute individual features of the method which are to be considered independently of one another, and which each also mutually independently refine the method and are thus also to be regarded as constituent parts of the method individually or in any combination other than that presented. Furthermore, the described embodiment may also be supplemented by further features of the method that have already been described.

FIG. 1 shows an operator control apparatus 10 for the selection and/or triggering and/or control of functions F of a motor vehicle (not illustrated here). Such functions F may for example be a navigation system of the motor vehicle, a multimedia device, an infotainment system, a so-called car menu, which can be displayed on a display unit (not shown here) of the motor vehicle, or a hands-free device of the motor vehicle.

The operator control apparatus 10 may for example be provided in a central console, such that it can be easily operated in particular by a driver of the motor vehicle. Here, the operator control apparatus 10 has a touch-sensitive operator control unit 12, a detection device 14 and a control device 16. The detection device 14 may for example be in the form of a pressure sensor such as is known per se. The control device 16 may also be a control unit of the motor vehicle which is designed to communicate with the operator control apparatus 10, in particular with the detection device 14 of the operator control apparatus 10.

The touch-sensitive operator control unit 12 is designed to detect a position at which the touch-sensitive operator control unit 12 is touched by an object 18, for example a finger. The detection device 14 is designed to detect a pressure $p_m$ that the object 18 exerts on the touch-sensitive operator control unit 12 at the position. The pressure $p_m$ detected by the detection device 14 can be made available to the control device 16.

The control device 16 is designed to determine a pressure threshold value $p_s$ as a function of a speed $v_m$ and/or an acceleration $a_m$ of the motor vehicle. The speed $v_m$ and/or the acceleration $a_m$ may for example be made available by a sensor device 20 of the motor vehicle. The control device 16 compares the pressure $p_m$ detected by the detection device 14 with the presently predefined pressure threshold value $p_s$. The control device 16 is designed to select and/or trigger and/or control the function F if the detected pressure $p_m$ exceeds the pressure threshold value $p_s$. The function F is thus selected and/or triggered and/or controlled only if, during the operator control of the operator control apparatus 10 or of the touch-sensitive operator control unit 12, the object 18 exerts on the touch-sensitive operator control unit 12 a pressure $p_m$ which exceeds the pressure threshold value $p_s$, that is to say a triggering threshold.

Figure 2:
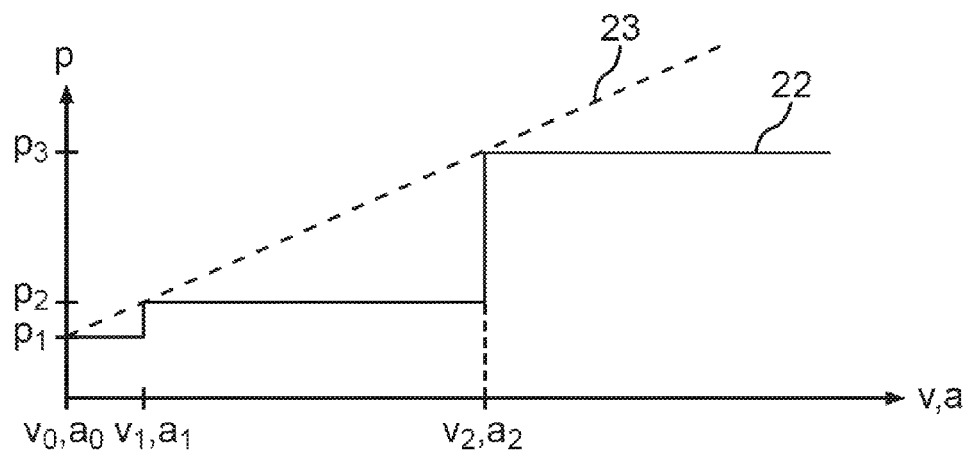
FIG. 2 is a graph of characteristic curves.

FIG. 2 shows, by way of example, two characteristic curves 22 and 23 on the basis of which every speed value v and/or every acceleration value a is assigned a pressure value p. On the basis of the characteristic curves 22 and 23, the pressure threshold value $p_s$ can be selected or predefined as a function of the detected speed $v_m$ and/or the detected acceleration $a_m$.

The characteristic curve 22 shows a stepped profile of the pressure p, which is plotted versus the speed v and/or the acceleration a. Here, a first pressure value $p_1$ corresponds to a speed value $v_0=0$ and/or acceleration value $a_0=0$, a second pressure value $p_2$ corresponds to a first speed $v_1 \neq v_0$ and/or a first acceleration $a_1 \neq a_0$, and a third pressure value $p_3$ corresponds to a second speed $v_2 > v_1$ and/or a second acceleration $a_2 > a_1$. Here, the characteristic curve 22 shows that the constant second pressure value $p_2$ is predefined in an interval $[v_1; v_2[$ and/or $[a_1; a_2[$, and the constant third pressure value $p_3$ is predefined from the second speed value $v_2$ and/or the second acceleration value $a_2$. By contrast, the characteristic curve 23 has a linear profile, in which the pressure value p is increased proportionally to the speed value v and/or the acceleration value a.

If, for example, the driver of the motor vehicle wishes to operate a menu button displayed on the touch-sensitive operator control unit 12, the pressure threshold value $p_s$ required for successful actuation of the menu button is adapted to a speed $v_m$ and/or acceleration $a_m$ of the motor vehicle. For example, if the driver of the motor vehicle wishes to operate the menu button when the motor vehicle is at a standstill, he or she is normally able to concentrate on his or her operator control input. In particular, he or she can direct his or her view to the touch-sensitive operator control unit 12.

The sensor device 20 can detect that the motor vehicle has no speed $v_m=v_0=0$ km/h, and is therefore at a standstill. The measured speed value $v_m=v_0=0$ km/h can be made available to the control device 16. The control device 16 can, on the basis of one of the characteristic curves 22 or 23, in this case on the basis of the characteristic curve 22, determine the first pressure value $p_1$, which corresponds to the speed $v_m=v_0=0$ km/h detected by the sensor device 20. The first pressure value $p_1$ may for example amount to 3 N. To successfully operate the menu button, the driver must thus exert on the touch-sensitive operator control unit 12 a pressure which is higher than the first pressure value $p_1=3$ N.

As soon as the motor vehicle is travelling, that is to say a speed $v_m=v_1 \neq v_0$ is measured by the sensor device 20, the driver can no longer divert his or her attention to the operator control of the operator control apparatus 10, but must generally concentrate on controlling the motor vehicle. For this reason, the control device 16 predefines the second pressure value $p_2$ as the pressure threshold value $p_s$ on the basis of one of the characteristic curves 22 or 23. In particular, the second pressure value $p_2$ is higher than the first pressure value $p_1$, and may for example amount to 5 N. Now, for successful operator control of the operator control apparatus 10, that is to say for successful actuation of the menu button, the driver must exert on the touch-sensitive operator control unit 12 a pressure which is greater than $p_2=5$ N. He or she must therefore press on the touch-sensitive operator control unit 12 more firmly or more intensely than he or she would have to when the motor vehicle is at a standstill. The increased pressure threshold value $p_s$ is intended to ensure that a driver who is operating the operator control apparatus 10 "blind" does not inadvertently trigger functions of the motor vehicle in an undesired manner.

As soon as it is measured by the sensor device 20 that the motor vehicle has or exceeds a speed $v_m=v_2$, the control device 16 predefines a corresponding third pressure value $p_3$ as the pressure threshold value $p_s$. The third pressure value $p_3$ may for example amount to 7 N. The speed $v_2$ may for example be present when the driver is travelling with the motor vehicle on a freeway, and must thus concentrate particularly intensively on his or her driving task.

Figure 3:
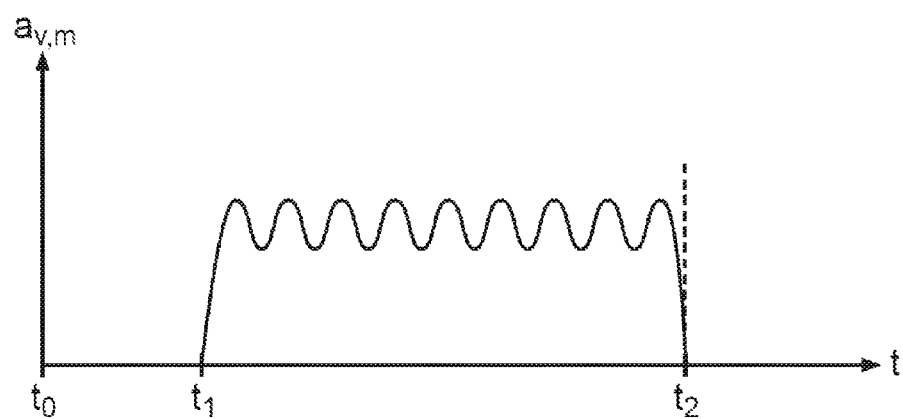
FIG. 3 is a graph of a measured vertical acceleration of the motor vehicle.

FIG. 3 is a graph of a profile of a measured vertical acceleration $a_{v,m}$ of the motor vehicle versus the time t. The figure shows that, in a time interval $[t_0, t_1[$, no measured vertical acceleration $a_{v,m}$ arises, that is to say $a_{v,m}=0$. However, in a time interval $[t_1, t_2[$, a measured vertical acceleration $a_{v,m}$ arises which exhibits a substantially periodic profile. The periodic profile indicates that the motor vehicle is moving on an underlying surface which has unevennesses, for example bumps. Owing to the unevennesses, vibrations can arise in the motor vehicle, which vibrations can pose difficulties for the driver with regard to an operator control input, for example when actuating the menu button. In particular, the vibrations can give rise to instances of erroneous operator control if the triggering threshold has been selected to be too low and the driver, for example using his or her finger, slips on the touch-sensitive operator control unit 12 and inadvertently accesses an undesired function of the motor vehicle. It is therefore possible, if it has been determined that the underlying surface has bumps, for the pressure threshold value $p_s$ to be increased in relation to a pressure threshold value $p_s$ that is predefined in the presence of an underlying surface without bumps. For example, if the motor vehicle is travelling at a speed $v_m$ which lies in the speed interval $[v_1; v_2[$ of the characteristic curve 22 and thus the second pressure value $p_2$ is predefined as the pressure threshold value $p_s$, the pressure threshold value $p_s$ may also be increased independently of the speed $v_m$, for example if it is detected on the basis of the vertical acceleration $a_{v,m}$ that the motor vehicle is moving on an underlying surface with bumps.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating an operator control apparatus of a motor vehicle, comprising:
   detecting a position at which a touch-sensitive operator control panel is touched by an object,
   detecting, by a pressure detector, a pressure with which the touch-sensitive operator control unit is acted on by the object at the position;
   detecting at least one of speed and acceleration of the motor vehicle;
   predefining a pressure threshold value as a function of the at least one of speed and acceleration of the motor vehicle;
   determining whether the pressure detected is higher than the pressure threshold value;
   triggering a function, assigned to the position, of the motor vehicle only when the pressure detected is higher than the pressure threshold value.

2. The method as claimed in claim 1,
   wherein said predefining includes predefining a characteristic curve based on which at least one of speed values and acceleration values are assigned pressure values, respectively, and
   wherein said method further comprises selecting one of the pressure values based on the characteristic curve and the at least one of speed and acceleration of the motor vehicle obtained by said detecting, as the pressure threshold value.

3. The method as claimed in claim 2, wherein the characteristic curve increases the pressure values as the at least one of speed values and acceleration values increase.

4. The method as claimed in claim 1, wherein said predefining includes predefining a first pressure value as the pressure threshold value when the motor vehicle is at a standstill, and a second pressure value as the pressure threshold value when the motor vehicle is travelling.

5. The method as claimed in claim 4, wherein said predefining further includes predefining at least one third pressure value as the pressure threshold value when the motor vehicle is travelling and the at least one of speed and acceleration detected exceeds at least one of a predefined speed value and a predefined acceleration value.

6. The method as claimed in claim 1, further comprising:
   determining when an actual underlying surface on which the motor vehicle is moving has bumps, based on the at least one of speed and acceleration detected; and
   increasing the pressure threshold value in relation to the pressure threshold value predefined based on a substantially smooth underlying surface when the motor vehicle is detected to be moving on the actual underlying surface having bumps.

7. The method as claimed in claim 6, wherein said determining when the actual underlying surface has bumps includes
   detecting a vertical acceleration of the motor vehicle over a predefined time interval, and
   determining whether the vertical acceleration has, within the time interval, a substantially periodic profile.

8. The method as claimed in claim 1, wherein said detecting the at least one of speed and acceleration of the motor vehicle includes measuring the acceleration of the motor vehicle based on a pressure value exerted on the pressure detector by an inherent weight of the touch-sensitive operator control panel during the acceleration of the motor vehicle.

9. The method as claimed in claim 1, wherein said detecting the at least one of speed and acceleration of the motor vehicle includes measuring the at least one of acceleration and speed by a sensor device of the motor vehicle.

10. An operator control apparatus for a motor vehicle, comprising:
    a touch-sensitive operator control panel configured to detect a position at which the touch-sensitive operator control panel is touched by an object;
    a pressure detector configured to detect a pressure with which the touch-sensitive operator control unit is acted on by the object at the position;

a controller configured
- to predefine at least one pressure threshold value as a function of at least one of speed and acceleration of the motor vehicle,
- to determine whether the pressure detected is higher than the at least one pressure threshold value; and
- to trigger a function, assigned to the position, of the motor vehicle when the pressure detected is higher than the at least one pressure threshold value.

11. The operator control apparatus as claimed in claim 10, wherein said controller is further configured
- to predefine a characteristic curve based on which at least one of speed values and acceleration values are assigned pressure values, respectively, and
- to select one of the pressure values based on the characteristic curve and the at least one of speed and acceleration of the motor vehicle, as the pressure threshold value.

12. The operator control apparatus as claimed in claim 10, wherein said pressure detector further detects the acceleration of the motor vehicle based on a pressure value exerted on the pressure detector by an inherent weight of the touch-sensitive operator control panel during the acceleration of the motor vehicle.

13. The operator control apparatus as claimed in claim 10, further comprising at least one sensor detecting the at least one of speed and acceleration of the motor vehicle.

* * * * *